(12) United States Patent
Someya et al.

(10) Patent No.: US 6,546,231 B1
(45) Date of Patent: Apr. 8, 2003

(54) COMMUNICATION TERMINAL DEVICE AND ROTARY OPERATION KEY

(75) Inventors: Takahisa Someya, Kanagawa (JP); Susumu Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/367,359

(22) PCT Filed: Nov. 27, 1998

(86) PCT No.: PCT/JP98/05360

§ 371 (c)(1),
(2), (4) Date: Aug. 8, 1999

(87) PCT Pub. No.: WO99/29087

PCT Pub. Date: Jun. 10, 1999

(30) Foreign Application Priority Data

Nov. 28, 1997 (JP) .............................................. 9-343748

(51) Int. Cl.[7] .................................................. H04Q 7/20
(52) U.S. Cl. ......................... 455/90; 455/575; 455/566; 345/157; 345/184; 379/433.06; 200/4; 200/5 R
(58) Field of Search .................... 455/566, 90, 575, 455/419, 550, 403; 379/433.06, 419; 345/157, 184, 169; 200/5 R, 4, 11, 14, 18, 564, 566

(56) References Cited

U.S. PATENT DOCUMENTS 4,273,971 A * 6/1981 Tregurtha ....................... 200/4
5,436,954 A * 7/1995 Nishiyama et al. ............ 379/58
5,703,947 A * 12/1997 Hino et al. .................. 379/419
5,835,732 A * 11/1998 Kikinis ........................ 395/281
5,915,228 A * 6/1999 Kunihiro et al. ............. 455/575
5,923,007 A * 7/1999 Emmert ....................... 200/5 R
5,931,873 A * 8/1999 Cisar ............................. 701/1
5,966,671 A * 10/1999 Mitchell et al. ............. 455/575
5,987,336 A * 11/1999 Sudo et al. .................. 455/566
6,097,964 A * 8/2000 Nuovo et al. ................ 455/550
6,178,338 B1 * 1/2001 Yamagishi et al. .......... 455/575
6,219,051 B1 * 4/2001 Furuya ........................ 345/341
6,366,771 B1 * 4/2002 Angle et al. ................. 455/414

FOREIGN PATENT DOCUMENTS

JP     02000041722 A  *  2/2000

* cited by examiner

Primary Examiner—Edward F. Urban
Assistant Examiner—Henry M. Quach
(74) Attorney, Agent, or Firm—Jay H. Maioli

(57) ABSTRACT

This invention relates to a communication terminal device. In order to realize a communication terminal device which improves the operational efficiency and the usability remarkably comparing to a conventional one, an operation key is designed to be rotated, pushed, and slid, and the movement direction or the movement amount of the cursor can be changed when the operation key is slid, so that the cursor can reach at a desired item quickly. As a result, the rotating amount to reach at a desired item can be reduced comparing to a conventional one. Therefore, a communication terminal device which improves the operational efficiency and the usability remarkably comparing to the conventional one can be realized.

13 Claims, 8 Drawing Sheets

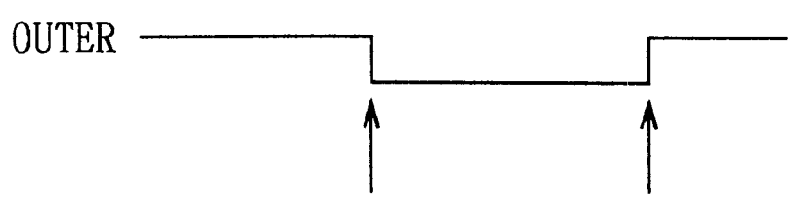
FIG. 6A
FIG. 6B
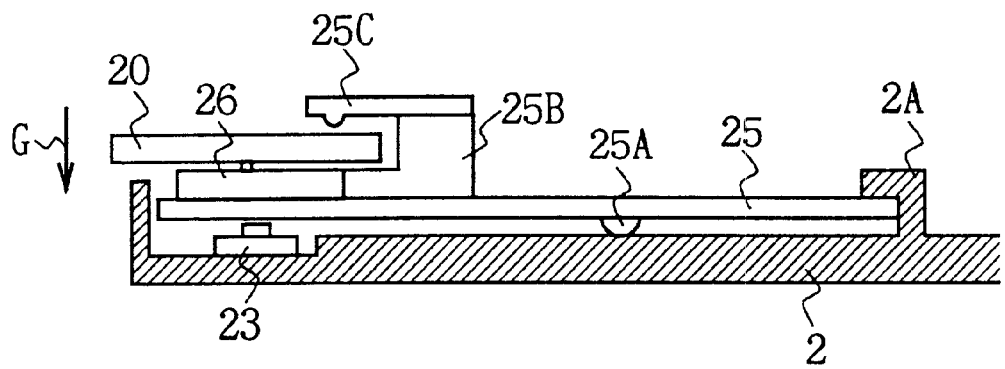
FIG. 7

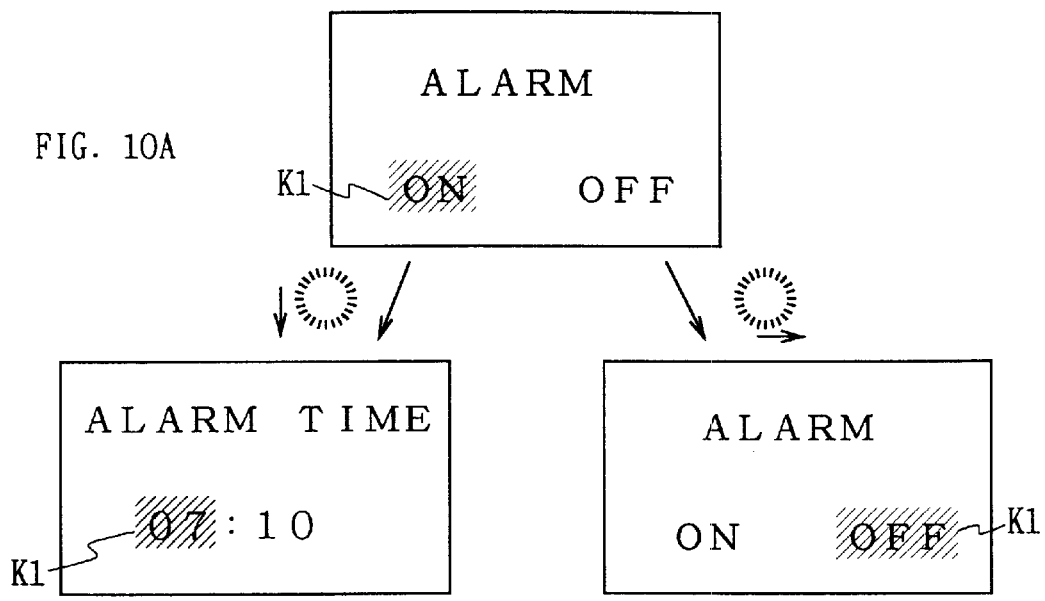
FIG. 10A
FIG. 10B
FIG. 10C
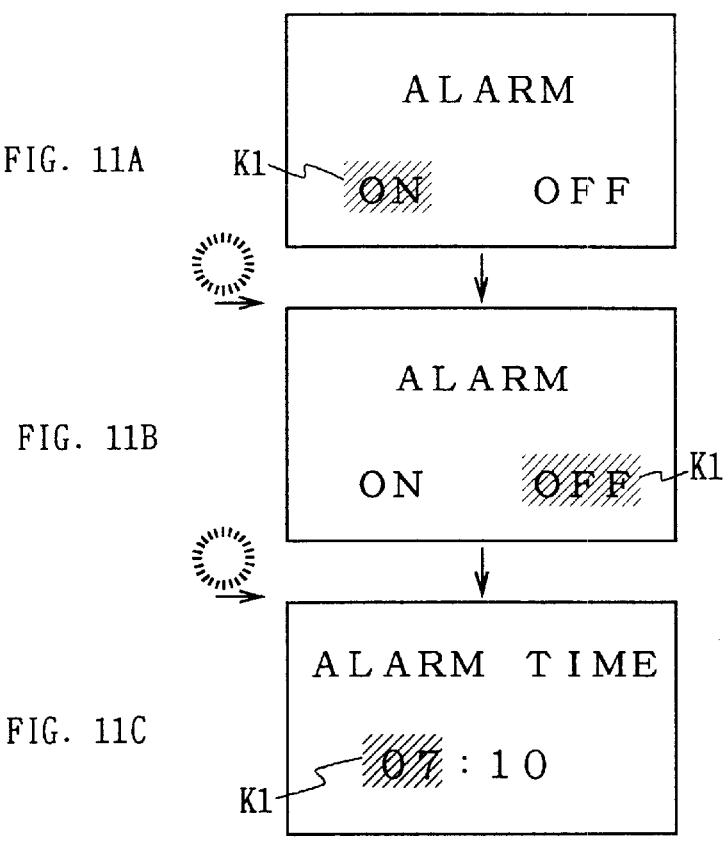
FIG. 11A
FIG. 11B
FIG. 11C

COMMUNICATION TERMINAL DEVICE AND ROTARY OPERATION KEY

TECHNICAL FIELD

The present invention relates to a communication terminal device and a rotary operation key, and more particularly, is applicable to a portable telephone device.

BACKGROUND ART

With the widespread use of a portable telephone device, various functions have been recently added to a portable telephone device. For example, the telephone numbers of partners are stored in a memory together with the names of the partners and the name of a desired partner is selected from the names of the partners read out on a display unit in accordance with the read instruction, so as to read out the telephone number of the desired partner, which is a so-called telephone directory function. Such a telephone directory function is added to the portable telephone device so that a user can read the telephone number by the name of a partner and call the partner even if the user does not remember the telephone number.

In a portable telephone device having a conventional telephone directory function, it is necessary to scroll through the names of a plurality of partners to select the name of a desired partner from the names of a plurality of partners displayed on the display unit. For this reason, a conventional portable telephone device includes an upward key and a downward key so as to direct that the partner's names to be displayed are scrolled upward and downward. However, if operation keys are provided separately in this way, two operation keys are needed to be operated. Thus, there is a problem that the operational efficiency lowers.

To solve the above problem, as disclosed in the Japanese Patent Application No. 232327/1994, the applicant proposes a communication terminal device which can give a scroll direction upward and downward and give a direction to determine the partner with one operation key by providing a rotary operation key which can be pushed in the inner direction of the body. According to the communication terminal device, the rotary operation key is rotated in a desired direction so as to scroll the partner's names in a desired direction, and at the same time, the rotary operation key is pushed in the inner direction of the body so as to determine the partner. Therefore, all operations can be performed with one operation key, thereby improving the operational efficiency remarkably compared to conventional keys.

In the communication terminal device having the rotary operation key, when the partners to be selected increase, it is necessary to rotate the rotary operation key a lot of times to find a desired partner. This device leaves a problem to be improved in an operational point.

DISCLOSURE OF INVENTION

The present invention is made to solve the above problem and its object is to provide a communication terminal device which improves usability and has an operational efficiency superior to a conventional device.

To solve the above problem, the present invention comprises: a body case having the outward shape which is held with one hand in the state that the thumb or the base of the thumb is put on one side of it; an operation key, which has a disc member wherein a projection being a part of the outer of the disc member slightly projected from the one side to the outside is provided at the position where the thumb is put on the one side of the body case so that the projection comes into contact with the thumb rotatively, for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give the strength toward the depth direction of the body case to the disc member; operation detecting means for detecting the rotation, push, and slide of the operation key; storing means for storing a plurality of items; display means for displaying a plurality of items from among the plurality of items read out from the storing means and displaying a cursor; and control means for moving the cursor in a desired direction to match the cursor position with one of the plurality of items and display it in accordance with the detected result of the rotation of the operation key output from the operation detecting means, for changing the movement direction or movement amount of the cursor caused by the rotation in accordance with the detected result of the slide of the operation key output from the operation detecting means, and for determining the item where the cursor is positioned in accordance with the detected result of the push of the operation key output from the operation detecting means.

In this way, the operation key can be rotated, pushed, and slid and the movement direction or the movement amount of the cursor is changed when the operation key is slid. Thereby, the cursor can reach a desired item quickly, with the result that the rotation amount to reach a desired item can be reduced compared to conventional keys.

Further, this invention comprises: a body case having the outward shape which is held with one hand in the state that the thumb or the base of the thumb is put on one side of it; an operation key, which has a disc member wherein a projection being a part of the outer of the disc member slightly projected from the one side to the outside is provided at the position where the thumb is put on the one side of the body case so that the projection comes into contact with the thumb rotatively, for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give the strength toward the depth direction of the body case to the disc member; operation detecting means for detecting the rotation, push, and slide of the operation key; storing means for storing a plurality of hierarchical items; display means for displaying a desired item among from the plurality of items stored in the storing means and displaying a cursor; and control means for moving the cursor in a predetermined direction on upper hierarchical items in accordance with the detected result of the rotation of the operation key output from the operation detecting means when the upper hierarchical items are displayed on the display means, for moving the cursor in a predetermined direction on lower hierarchical items in accordance with the detected result of the push of the operation key output from the operation detecting means when the lower hierarchical items are displayed on the display means, and for determining the lower hierarchical item where the cursor is being displayed in accordance with the detected result of the slide of the operation key output from the operation detecting means.

In this way, the operation key can be rotated, pushed, and slid. Then, the cursor moves on the upper hierarchical items when the operation key is rotated, the cursor moves in a predetermined direction on the lower hierarchical items when the operation key is pushed, and the lower hierarchical item where the cursor is displayed is determined when the operation key is slid. Thereby, the selection and determination can be performed independently on the lower hierarchical items, with the result that the rotational efficiency when selecting a desired item from the hierarchical items can be improved.

Further, according to this invention, a rotary operation key provided in the body case of the electronic device which includes the body case having the outward shape held with one hand in the state that the thumb or the base of the thumb is put on one side of it, comprises: a disc member wherein a projection being a part of the outer of the disc member slightly projected from the one side to the outside is provided at the position where the thumb is put on the one side of the body case so that the projection comes into contact with the thumb rotatively; and supporting means for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give the strength toward the depth direction of the body case to the disc member.

Such a rotary operation key is provided in the electronic device, so as to operate the rotary operation key in three directions in the state that the body case is held with one hand. Thereby, the operational efficiency and the usability of the electronic device can be improved.

BRIEF DESCRIPTION OF DRAWINGS

FIG. 6 is output waveforms explaining the operation of the jog dial.

FIG. 7 is a side view showing the mechanism of the jog dial.

FIG. 10 is a schematic diagram explaining the operation in setting the operation mode.

FIG. 11 is a schematic diagram explaining the conventional operation in setting the operation mode.

BEST MODE FOR CARRYING OUT THE INVENTION

An embodiment of the present invention is described below by referring to the accompanying drawings.

(1) Entire Configuration

Figure 1:
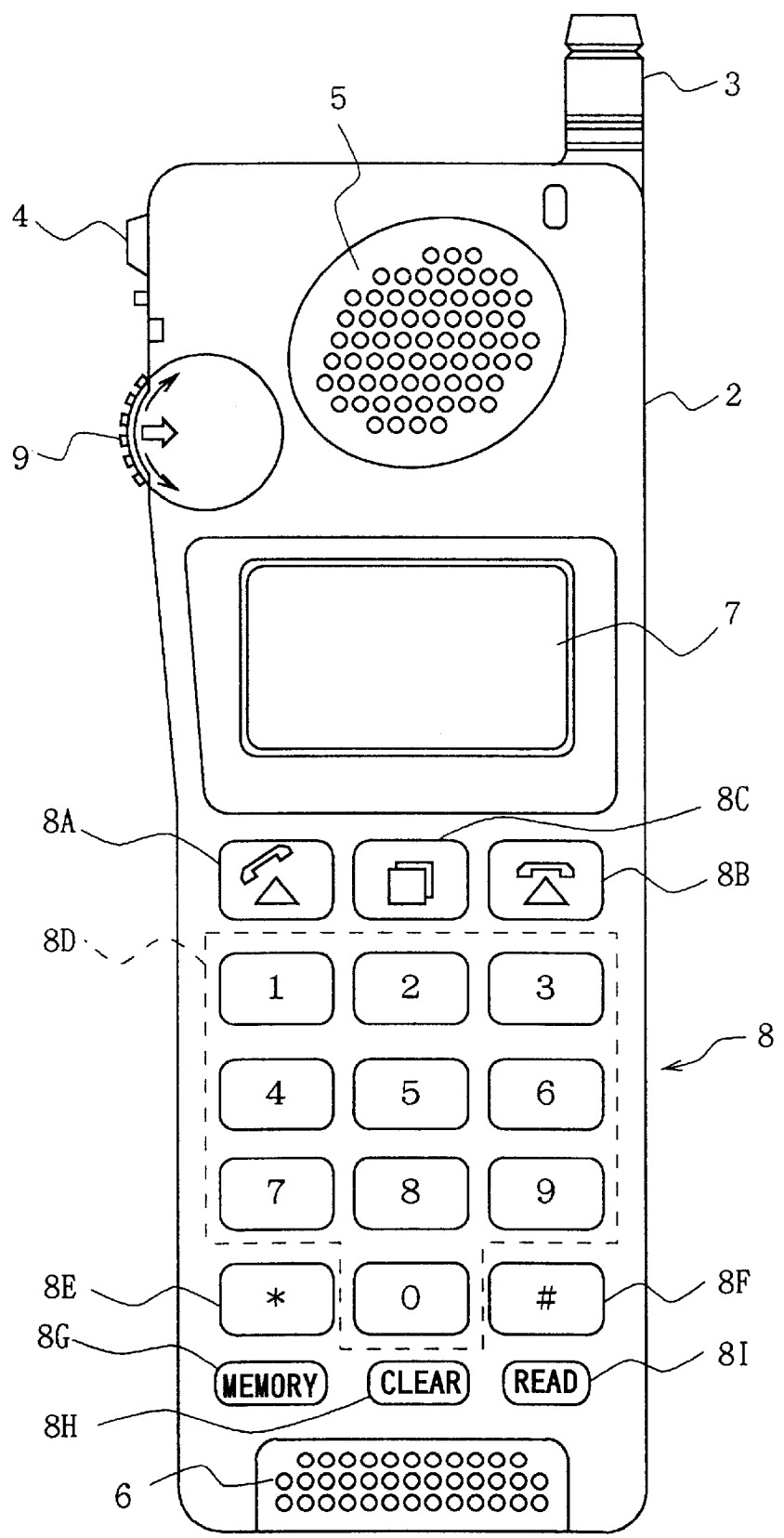
FIG. 1 is an outward diagram showing the outward constitution of a portable telephone device according to the present invention.

In FIG. 1, 1 denotes a portable telephone device according to this invention as a whole, and various members are installed on a body case 2 made of synthetic resin materials. An antenna 3 for transmittance and reception which can be extended and retracted is installed on the top of the body case 2. The portable telephone device 1 transmits and receives radio waves between a base station apparatus and itself through the antenna 3.

A power switch 4 is provided on the side of the body case 2. The power switch 4 is turned on to supply electric current from a battery pack (not shown) installed on the back of the body case 2 to each of electric circuits, and is started up to be in an operable state as a portable telephone device.

Further, a speaker 5 is provided at the upper part on the front of the body case 2 as electricity-to-sound converting means. The call partner's voice is output from the speaker 5 during a call. Further, a microphone 6 is provided at the lowest part on the front of the body case 2 as sound-to-electricity converting means. The user's voice is collected from the microphone 6 during a call.

Further, a liquid crystal display (LCD) 7 is provided at the middle part on the front of the body case 2 as display means. The LCD 7 displays various information such as reception state of radio waves, battery capacity, telephone number when making a telephone call, telephone numbers and the names of the partners registered as a telephone directory, information of sent history, and information of various registered contents.

Furthermore, various operation keys 8 are provided at the lower part on the front of the body case 2 as operation means. The operation keys 8 are used to input various directions. In this case, the following nine keys are provided as the operation keys 8 concretely. The nine keys are: "phone" key 8A, "end" key 8B, "redial" key 8C, "0" to "9" numeral keys 8D, "*" key 8E, "#" key 8F, "memory" key 8G, "clear" key 8H, and "read" key 8I.

The following functions are assigned to these operation keys 8. A function for inputting a direction to phone at the input telephone number, the telephone number read from a telephone directory, or the telephone number read from the sent history is assigned to the "phone" key 8A. A function for inputting a direction to finish talking and for inputting a direction to finish other various operation mode is assigned to the "end" key 8B. A function for inputting direction to read the sent history that the telephone numbers of the partners who are telephoned by a user are displayed together with the date and time is assigned to the "redial" key 8C.

Functions for inputting corresponding numeral information are respectively assigned to ten numeral keys 8D. A function for inputting "*(asterisk)" character is assigned to "*" key 8E. A function for inputting "#" character is assigned to "#" key 8F. A function for inputting a direction to register a telephone number as a telephone directory is assigned to "memory" key 8G. A function for inputting a direction to delete the displayed contents or registered contents is assigned to "clear" key 8H. A function for inputting a direction to read the telephone number registered as a telephone directory is assigned to "read" key 8I.

Further, a jog dial 9 is provided at the upper part on the side of the body case 2 as a rotary operation key. The jog dial 9 is rotated to scroll and display various display items such as the sent history list or the telephone directory list displayed on the liquid crystal display 7. Moreover, the jog dial 9 is pushed into the inner direction of the body case 2 to determine the item being displayed. The jog dial 9 can be also pushed into the depth direction (perpendicular to FIG. 1) along the side of the body case 2. The jog dial 9 is rotated with being pushed into the depth direction to scroll and display the display items with another movement amount. In addition, similarly to the "phone" key 8A, a function for inputting a direction to phone and a function as a function key are also assigned to the pushing operation of the jog dial 9 in the inner direction. In the portable telephone device 1, desired characters can be input by the operation of the jog dial 9 to make the telephone directory list.

Figure 2:
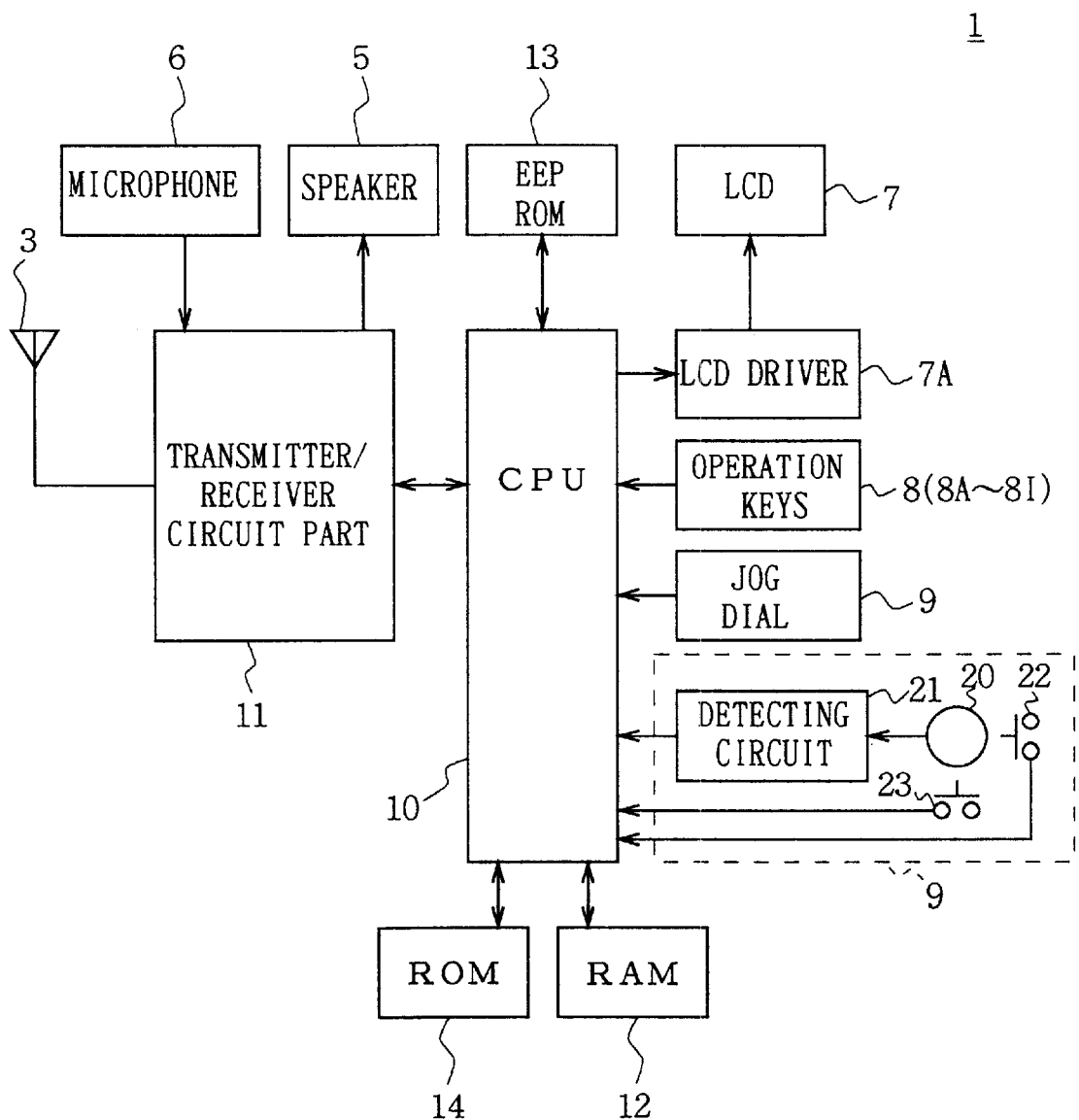
FIG. 2 is a block diagram showing the internal constitution of the portable telephone device.

Referring to FIG. 2, the circuit constitution of the portable telephone device 1 will be explained here. The body case 2 of the portable telephone device 1 is provided with circuits as shown in FIG. 2. The directed information input from various operation keys 8 or the jog dial 9 described above is firstly input to a CPU (Central Processing Unit) 10 which is a control means. The CPU 10 controls a LCD driver circuit 7A based on the input directed information to display various information in accordance with the directed information (e.g., input telephone number, menu items, sent history, or telephone directory) on the liquid crystal display 7. The CPU 10 further controls a transmitter/receiver circuit part 11 based on the input directed information to execute such processing in accordance with the directed information as phone processing and end processing. The CPU 10 accesses a RAM (Random Access Memory) 12 which is a first storing means to store a predetermined information, or accesses an EEPROM (Electrically Erasable and Programmable Read Only Memory) 13 which is a second storing means to store various information which are desired to be maintained after the power is shut-off, such as the sent history and the telephone directory list. In this connection, the CPU 10 performs such control operations based on the program code stored in a ROM (Read Only Memory) 14.

The transmitter/receiver circuit 11 outputs a control signal by the control from the CPU 10 through the antenna 3 to perform a phone processing, or receives a received signal from the base station apparatus through the antenna 3 to inform a reception of the CPU 10. The transmitter/receiver circuit 11 further performs a predetermined signal processing on an audio signal input from the microphone 6 to transmit it during a call, or performs a predetermined signal processing on a received signal to demodulate the audio signal, which is output to the speaker 5.

When roughly classified, the jog dial 9 is composed of a disc member 20, a detecting circuit 21, and a first and second switches 22, 23. In the jog dial 9, when the disc member 20 is rotated, the detecting circuit 21 detects the rotating direction and the rotated amount, and this is informed of the CPU 10. In the jog dial 9, when the disc is pushed in the inner direction of the body case 2, the first switch 22 is pushed, and when the disc member 20 is pushed in the depth direction along the side, the second switch 23 is pushed. The CPU 10 detects the condition of the first and second switches 22, 23. The CPU 10 thereby controls various operations of the jog dial 9 described above based on the condition of the first and second switches 22, 23 and based on the rotating direction and the rotated amount from the detecting circuit 21.

Here, the jog dial 9 will be explained concretely. The jog dial 9 is provided at the upper part on the left side of the body case 2, and is rightly positioned at the left hand's thumb position when an user holds the body 2 with the left hand. Thereby, even in the state of holding the body 2, the user can rotate the jog dial 9 by bending and extending the left hand's thumb, and push the jog dial 9 by pressing the left hand's thumb into the inner direction of the body case 2, and further push the jog dial 9 into the depth direction by slightly sliding the left hand's thumb into the depth direction along the side of the body case 2. In this way, the user can operate the jog dial 9 with one hand easily.

Figure 3:
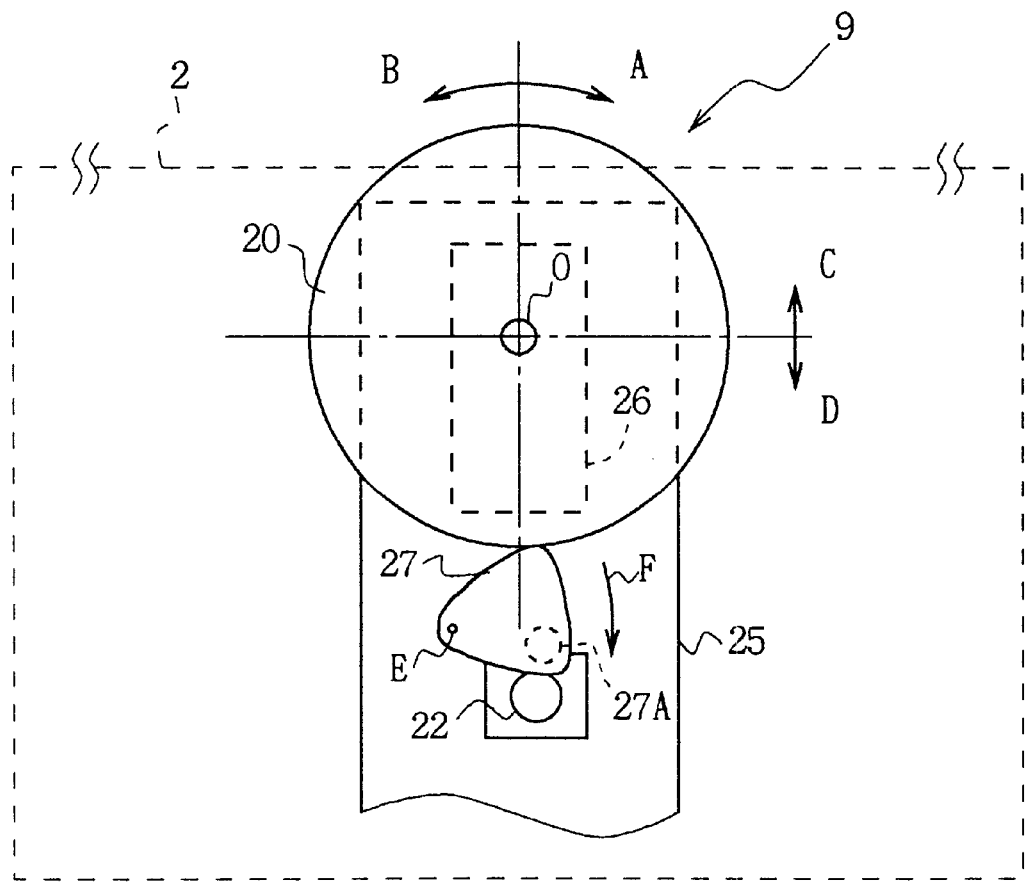
FIG. 3 is a schematic diagram showing the mechanism of a jog dial.

The jog dial 9 has the disc member 20 as described above. As shown in FIG. 3, the disc member 20 is slightly projected from the side of the body case 2, so that the thumb can be put on the projection to rotate it, to push it in the inner direction of the body case 2, and to push it in the depth direction along the side. The disc member 20 is supported by a base part 25 made of synthetic resin materials in such a way that it can rotate in the direction shown by an arrow "A" or "B" with a rotation axis "O" being centered. The thumb is put on the projection to rotate the disc member 20 in the direction of the arrow "A" or "B". In this connection, when the disc member 20 is rotated in the direction of the arrow "A" or "B" by a predetermined angle, the sensation of click can be obtained. Thereby, a user can understand by feeling the rotated amount of the disc member 20 (hereinafter, the rotated amount which can obtain the sensation of click is referred to as one click).

Practically, the disc member 20 is not directly supported on the base part 25, but supported on the base part 25 through a slide member 26. The disc member 20 thereby moves in the direction shown by an arrow "D" when it is pushed in the inner direction of the body case 2 by the thumb. In this connection, the disc member 20 is pressed in the direction shown by an arrow "C" by the slide member 26, so as to keep the disc member 20 being slightly projected from the body case 2 as shown in FIG. 3 while the disc member 20 is not pushed into the inner direction of the case (that is, in the direction of the arrow "D").

Figures 4A, 4B:
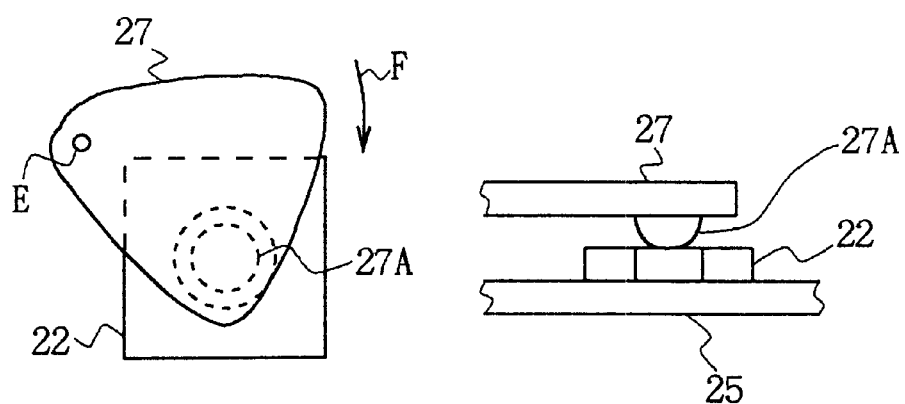
FIG. 4 is a schematic diagram explaining the push operation of the first switch according to a clamp member.

Additionally, a clamp member 27 and the first switch 22 are also provided on the base part 25. The clamp member 27 rotates in the direction shown by an arrow "F" with a fulcrum "E" being centered, when the disc member 20 moves in the direction shown by the arrow "D". A projection 27A projecting below is provided on the top of the clamp member 27. When the projection 27A rotates in the direction of the arrow "F" with the fulcrum "E" being centered, it reaches the top side of the first switch 22 as shown in FIGS. 4A and 4B. In the jog dial 9, when the disc member 20 is pushed in the direction of the arrow "D", the projection 27A presses the first switch 22.

Figure 5A:
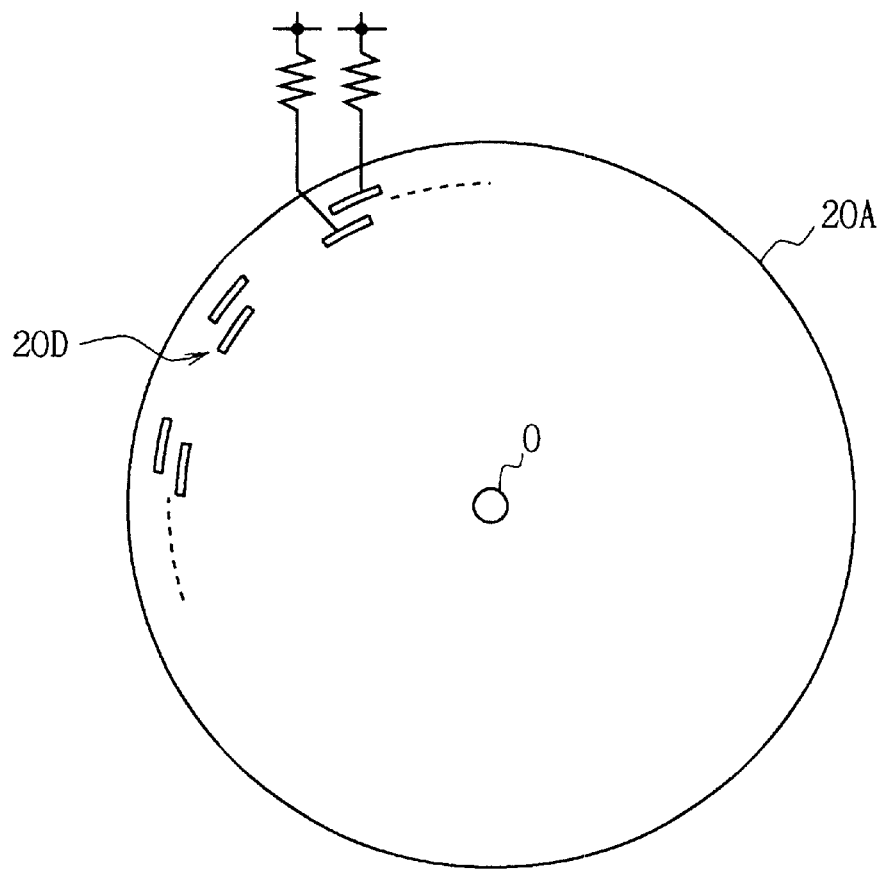
FIG. 5 is a schematic diagram showing the mechanism of a disc member.
Figure 5B:
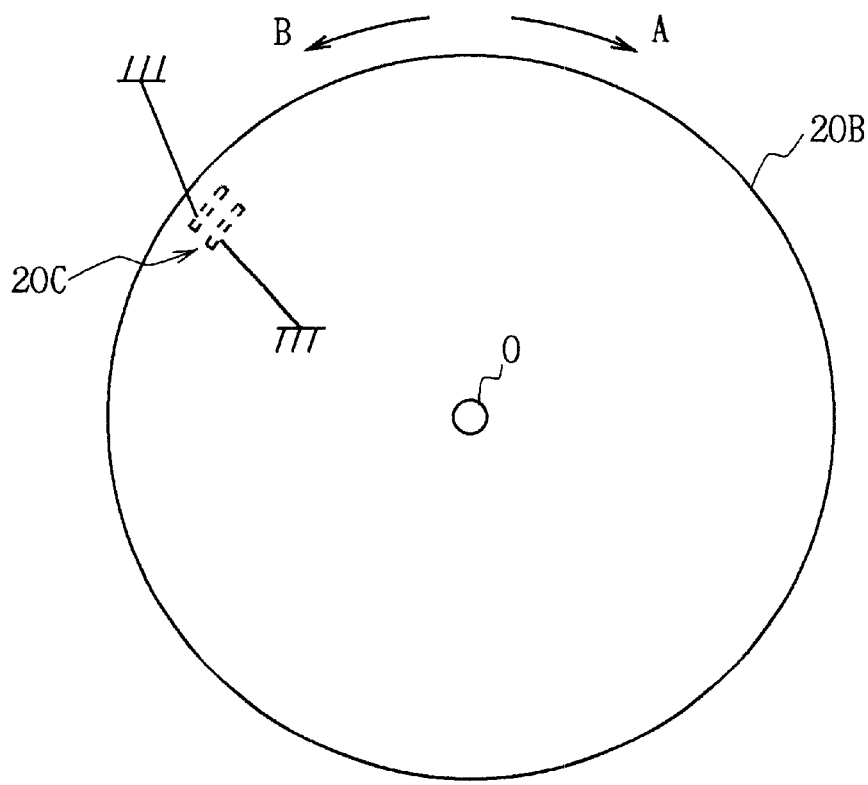

As shown in FIG. 5, the disc member 20 is composed of two disc members 20A and 20B actually. The disc member 20B is a movable member placed on the upper side of the disc member 20A, and is installed to rotate relatively to the fixed disc member 20A. A pair of electrodes 20C is provided on the movable disc member 20B. The electrodes 20C come in contact with twenty pairs of electrodes 20D provided along the circumference of the disc member 20A when it is assembled. In this connection, the electrodes 20D provided on the fixed disc member 20A are so formed that they are slightly shifted between the inner and the outer.

Thus, when the disc member 20B rotates in the direction of the arrow "A", as shown in FIG. 6A, the inner electric potential of the electric potential output from the electrodes 20D first falls to the ground potential. On the contrary, when the disc member 20B rotates in the direction of the arrow "B", as shown in FIG. 6B, the outer electric potential first falls to the ground potential. The detecting circuit 21 uses this to detect which of the inner potential or the outer potential falls to the ground potential first, so as to detect the rotating direction of the disc member 20B. Further, the detecting circuit 21 counts up the number of pulses output from the outer electrode, so as to detect the rotated amount of the disc member 20B.

As shown in FIG. 7, the base part 25 in which the disc member 20 is installed is hooked and supported by a hook part 2A provided inside the body case 2 so as to be installed in the body case 2. The projection 25A is provided under the base part 25, and the base part 25 is supported by the projection 25A from below. On the position counter to the disc member 20 over the base part 25, the second switch 23 is provided slightly apart from the base part 25. In this case, since the base part 25 is supported from below by the projection 25A, when the disc member 20 is pushed in the depth direction shown by an arrow "G", the base part 25 is bent downward in the direction shown by the arrow "G" with the projection 25A being a fulcrum. At this time, the bottom side of the base part 25 bent downward comes into contact with the second switch 23 and presses the second switch 23. In this way, in the jog dial 9, when the disc member 20 is pushed in the depth direction shown by the arrow "G", the base part 25 in which the disc member 20 is installed is bent so as to press the second switch 23.

In addition, on the base part 25, a supporting member 25B is provided and an arm member 25C is provided through the supporting member 25B. The arm member 25C is provided over one portion of the disc member 20. Thereby, when the disc member 20 is pressed in the direction shown by the arrow "G", the one portion of the disc member 20 is inclined to be lifted in accordance with the strength. However, the one portion of the disc member 20 is pressed from above by the arm member 25C, and this prevents the one portion from being lifted contrarily.

(2) The Operation Examples Using Jog Dial

In this paragraph, the typical operation examples using the jog dial 9 will be explained. When the jog dial 9 is rotated in the state that various items are displayed on the liquid crystal display 7, the cursor displayed on the liquid crystal display 7 can be moved up or down. The jog dial 9 is pushed toward the inner direction of the body case 2 in this state, so as to make it possible to direct the CPU where the cursor is positioned and the lower hierarchical items. Moreover, when the jog dial 9 is rotated in the state that the telephone directory list is displayed, the cursor can be moved up or down. Then, the jog dial 9 is pushed in the inner direction of the body case 2 in the state that the cursor is matched with a desired partner, so as to phone the partner.

Further, when the jog dial 9 is rotated in the state that a character input mode is set, the cursor can be moved up and down, or left and right. Then, the jog dial 9 is pushed in the inner direction of the body case 2 in the state that the cursor is matched with a desired character, so as to input the character. When the jog dial 9 is rotated in the state that a registration mode is set, a user can enter the registration mode of an arbitrary item. Then, the jog dial 9 is pushed in the inner direction of the body case 2 or pushed in the depth direction along the side in this state, so as to direct to select or determine the registered content.

(2-1) Retrieval of Telephone Directory List by Jog Dial

Figure 8A:
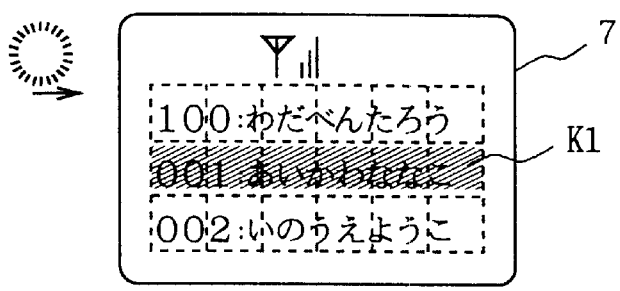
FIG. 8 is a schematic diagram explaining the operation in the retrieval of a telephone directory list.

In this paragraph, the retrieval of the telephone directory list described above will be explained with reference to FIG. 8. When the jog dial 9 is rotated or the read key 8I is pushed in the state that a call is not made to direct to read the telephone directory list, in the portable telephone device 1, the partner's name registered as the telephone directory list is read out from the EEPROM 13 and it is displayed on the liquid crystal display 7. In the portable telephone device 1, the telephone numbers for one hundred persons at maximum can be registered. When the telephone directory list is read out, as shown in FIG. 8A, registered in the abbreviated dialing "001" is displayed at the center of the liquid crystal display 7, registered in the last abbreviated dialing "100" is displayed above that, and registered in the abbreviated dialing "002" is displayed below that. In this case, the cursor K1 is displayed at the center of the telephone directory list, that is the abbreviated dialing "001", and the partner of the abbreviated dialing "001" is being selected at this time.

Figure 8B:
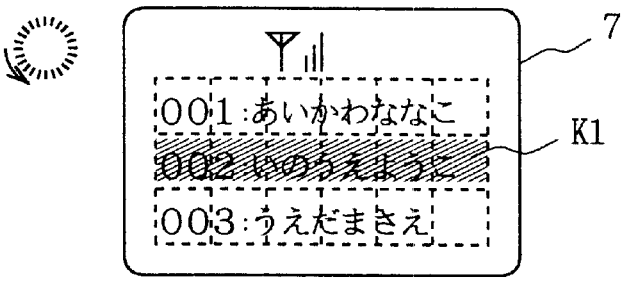

When the jog dial 9 is rotated for one click downward in this state, as shown in FIG. 8B, the telephone directory list is scrolled for one line upward. As a result, the partners' names registered in the abbreviated dialing "001" and "002" are displayed in the order of number, and at the same time the partner's name registered in the abbreviated dialing "003" is newly displayed on the third line. In this connection, the cursor K1 is also displayed at the center of the telephone directory list similarly, so that the partner of the abbreviated dialing "002" is being selected in this state.

Figure 8C:
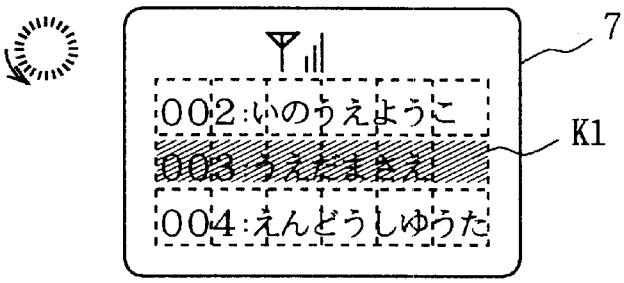

Further, when the jog dial 9 is rotated for one click downward in this state, as shown in FIG. 8C, the telephone directory list is scrolled for one line upward. As a result, the partners' names registered in the abbreviated dialing "002" and "003" are displayed in the order of number, and at the same time the partner's name registered in the abbreviated dialing "004" is newly displayed on the third line. In this connection, the cursor K1 is also displayed at the center of the telephone directory list similarly, so that the partner of the abbreviated dialing "003" is being selected in this state.

Figure 8D:
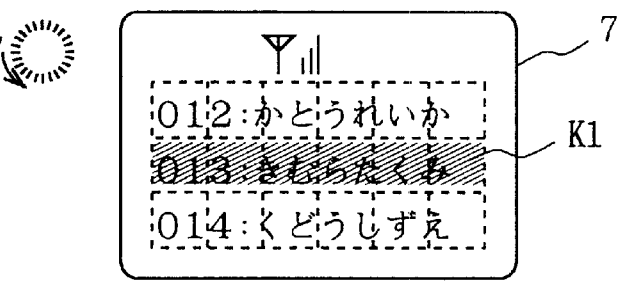

When the jog dial 9 is rotated for one click downward in this state while pushing it in the depth direction, the scrolling amount by one click rotation is changed from one line to ten lines, and as shown in FIG. 8D, the telephone directory list is scrolled for ten lines upward. As a result, the partners' names registered in the abbreviated dialing "012", "013", and "014", and are successively displayed in the order of number. In this connection, the cursor K1 is also displayed at the center of the telephone directory list similarly, so that the partner of the abbreviated dialing "013" is being selected in this state.

Figure 8E:
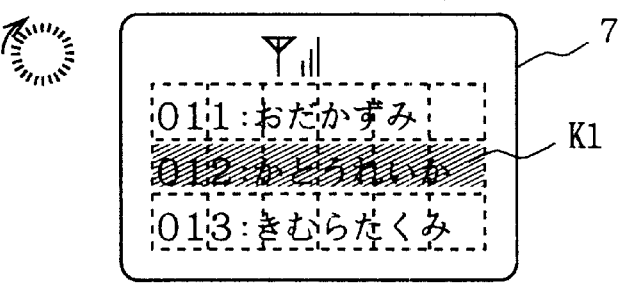

If a desired partner of the telephone directory list is, the cursor may be moved back one line from the current selection and the jog dial 9 is rotated for one click upward in this state. As shown in FIG. 8E, the telephone directory list is scrolled for one line downward by this operation, so that the cursor K1 can be displayed at the desired partner to select.

Figure 8F:
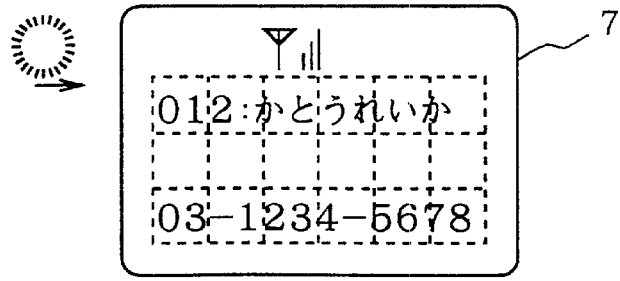

After the cursor K1 is displayed at the desired partner, the jog dial 9 is pushed in the inner direction of the body case to determine the partner, and as shown in FIG. 8F, the detailed information of the selected, that is the telephone number, can be displayed. In addition, when the jog dial 9 is further pushed in the inner direction of the body case in this state, the portable telephone device 1 phones the partner whose telephone number is being displayed (i.e., the displayed telephone number is transmitted to the base station apparatus through the transmitter/receiver circuit part 11 to connect the communication line). The user can phone in the state of touching the jog dial 9 without the operation of the "phone" key 8A.

In addition, it is not shown in the figure especially, but when the jog dial 9 is rotated for one click upward while pushing it in the depth direction, the scrolling amount of the rotating operation for one click is changed from one line to ten lines similarly, so that the telephone directory list is scrolled for ten lines downward.

In the portable telephone device 1, the push of jog dial 9 in the depth direction is assigned to the change of the scrolling amount (i.e., the change of the amount that a cursor moves). When the jog dial 9 is rotated while pushing it in the depth direction, the movement amount of cursor is changed from one line to ten lines, so that the desired partner can be found quickly. For example, if the partner registered at the abbreviated dialing "050" is desired to be found in the state that the abbreviated dialing "001" is being currently selected, the jog dial 9 is rotated for five clicks downward while pushing it in the depth direction, so that the desired partner can be found. The desired partner can be found quickly compared to the conventional operation in which the user must rotate it for fifty clicks.

(2-2) Character Input by Jog Dial

Next, in this paragraph, the character input using the jog dial 9 will be explained with reference to FIG. 9. In the portable telephone device 1, when the telephone directory list is registered, the Kana characters can be input to register a partner's name, and at the same time, the input Kana characters can be converted into the Kanji characters when the Kanji converting mode is set.

Figure 9A:
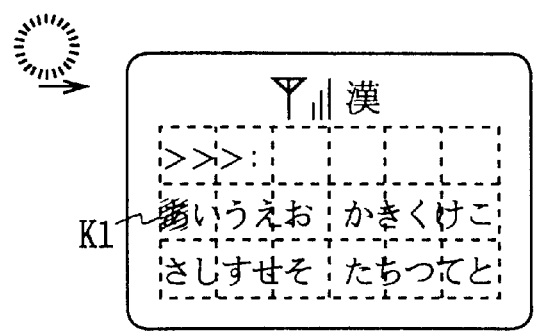
FIG. 9 is a schematic diagram explaining the operation in the character input mode.

In the case of inputting the Kana characters, the jog dial 9 is first pushed in the inner direction of the body case in the state that a call is not made, to read the menu prepared in the portable telephone device 1. Then, the jog dial 9 is rotated in a predetermined direction to find the character input mode from among the menu items (that is the jog dial 9 is rotated to display the cursor K1 at the item of the character input mode). In this state, the jog dial 9 is pushed in the inner direction similarly to set the character input mode. The character input mode picture shown in FIG. 9A is displayed on the liquid crystal display 7 by this setting operation.

In this connection, in the case that the Kanji converting mode is previously set by a predetermined operation, representing that the Kanji converting mode is set is displayed at the top portion on the initial picture of the character input mode. Moreover, the input character mark ">>>:" is displayed in the second line on the initial picture and the Kana characters input by the operation described below are successively displayed after the input character mark. Further, the Kana characters of line of the Japanese syllabary are displayed one line below the mark, and the Kana characters of line and line of the Japanese syllabary are displayed one line further below the mark. In addition, the characters of line, line, line, line, line and line are virtually prepared further below them, although they are not displayed in this state. If the jog dial 9 is rotated downward, these characters are successively scrolled and displayed in accordance with the rotated amount. In this connection, on the initial picture of the character input mode, the cursor K1 is firstly displayed at the Kana character, and that character is being selected.

Figure 9B:
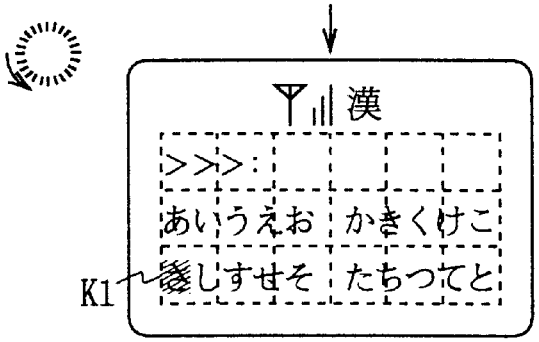
Figure 9C:
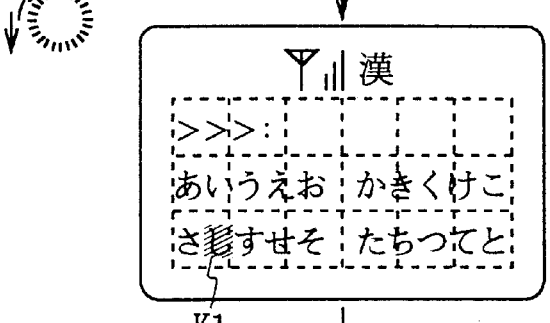

To input the Kana character for example, the jog dial 9 is first rotated for one click downward. As shown in FIG. 9B, the cursor K1 is moved downward for one line and is displayed at the Kana character which is being selected. When the jog dial 9 is then rotated for one click upward while pushing it in the depth direction, the movement direction of the cursor K1 is changed. As a result, as shown in FIG. 9C, the cursor K1 is moved in the right direction for one character and is displayed at the Kana character which is being selected. In this connection, if the jog dial 9 is pushed in the depth direction, the rotating operation of the jog dial 9 in the up and down direction is changed from the operation corresponding to the up and down movement of the cursor K1 to the operation corresponding to the left and right movement of the cursor K1.

Figure 9D:
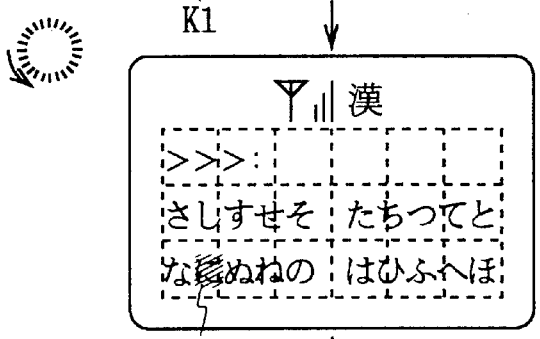

Then, the jog dial 9 is rotated for one click downward without pushing it in the depth direction to change the movement direction of the cursor K1 according to the rotation of the jog dial 9 into the down direction again. As a result, as shown in FIG. 9D, the cursor K1 is moved downward for one line to be displayed at the Kana character, which is being selected. In addition, the position where the cursor K1 is displayed on the picture is not changed, and the table of the Japanese syllabary is scrolled upward for one line as a whole so that the cursor K1 is visually moved downward for one line.

Figure 9E:
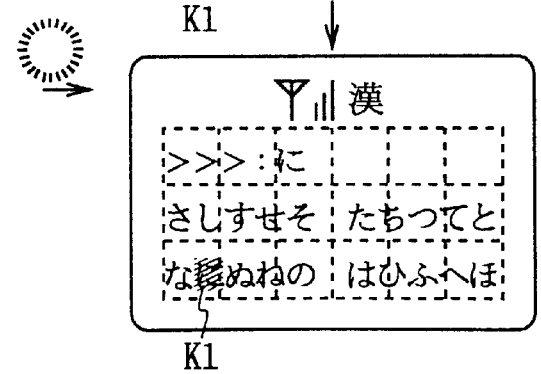

After the cursor K1 is moved to the desired character by operating the jog dial 9, the jog dial 9 is then pushed in the inner direction of the body case to determine the character as shown in FIG. 9E and the determined Kana character is displayed after the input character mark. Thereafter, desired characters are successively selected and determined by the same operation of the jog dial 9 described above, and predetermined operation keys 8A–8I are is used to input the Kanji converting direction to display the Kanji corresponding to the input Kana characters. Thereby, the desired characters can be input with the Kanji.

In this way, in the portable telephone device 1, in the character input mode, the push of the jog dial 9 in the depth direction is assigned to the change of the cursor movement direction. The jog dial 9 is simply rotated upward or downward to move the cursor K1 up or down, and the jog dial 9 is rotated upward or downward while pushing it in the depth direction to move the cursor K1 in the right or left direction. Thereby, the cursor quickly reaches a desired character and user can input a character quickly compared to conventional devices.

In this connection, in the case where the rotation in the up and down direction and the pushing in the inner direction of the body case are only prepared in the jog dial 9 as a conventional one, the cursor is only moved in the right or left direction simply. Thereby, it takes more time to select a desired character, since the cursor is moved starting from the Kana character, successively like . . . However, in the portable telephone device 1, the pushing in the depth direction is prepared in the jog dial 9 to change the movement direction of the cursor K1 by pushing the jog dial 9 in the depth direction, so that the cursor K1 can be moved in the lines direction and the columns direction in the table of the Japanese syllabary, so that the cursor can reach the desired character quickly and the character can be selected and input quickly.

(2-3) Setting of Operating Mode by Jog Dial

Next, in this paragraph, the setting of the operation mode using the jog dial 9 will be explain with referring to FIGS. 10 and 11. Note that the alarm setting will be explained here as a typical operation mode.

To set the alarm, the jog dial 9 is first pushed in the inner direction of the body case in the state that a call is not made to read out the menu prepared in the portable telephone device 1. Then, the jog dial 9 is rotated in a predetermined direction to find the alarm setting mode from the menu items (that is, the jog dial 9 is rotated to display the cursor K1 at the item of the alarm setting mode). In this state, the jog dial 9 is similarly pushed in the inner direction to set the alarm setting mode. As shown in FIG. 10A, the alarm setting mode picture is displayed on the liquid crystal display 7 by this setting operation.

In this connection, on the initial picture of the alarm setting mode, the characters "alarm" representing the alarm setting mode is displayed in the first line to show an user the alarm setting mode. Further, the alarm setting mode is provided with the alarm starting and non-starting functions, "ON" and "OFF" representing them are displayed in the second line. On the initial picture of the alarm setting mode, the cursor K1 is initially displayed at "ON" position and the alarm starting is being selected.

In the portion telephone device 1, in setting the operation mode, the push of the jog dial 9 in the depth direction is assigned to the determination of the item where the cursor K1 is displayed; the push of the jog dial 9 in the inner direction of the body case is assigned to the movement of the cursor K1 in the right direction (after the cursor reaches the end of the line, it moves to the head of the line or the next line, and moves in the right direction similarly), that is the selection of the item; and the rotation of the jog dial 9 is assigned to the change of the mode from the operation mode into the menu item selecting mode of the upper hierarchy (when the jog dial is rotated upward, the cursor K1 moves to the menu item above the menu item currently read, and when it is rotated downward, the cursor K1 moves to the menu item below the menu item currently read).

Thereby, to start-up the alarm, on the initial picture of the alarm setting mode, the jog dial 9 is pushed in the depth direction to set the alarm to a starting condition. As shown in FIG. 10B, the picture proceeds to the time setting picture for setting the alarm starting time. On the time setting picture, the cursor K1 is displayed at the position of "hour", and the "numerical" key 8D is used to input a desired numerical in this state. After the information of "hour" is input, the cursor K1 automatically moves to the position of "minute", and the "numerical" key 8D is similarly used to input a desired numerical. In this way, the time to start the alarm can be input.

In addition, to set the alarm not to start-up, on the initial picture of the alarm setting, the jog dial 9 is pushed in the inner direction of the body case to set the alarm to a non-starting condition. As shown in FIG. 10C, the cursor K1 moves in the right direction to be displayed at the position of "OFF", and the jog dial 9 is pushed in the depth direction in this state so as to set the alarm to a non-starting condition.

In this way, in the portable telephone device 1, in the setting of the operation mode, the push of the jog dial 9 in the inner direction of the body case is assigned to the selection of the item, and the push of the jog dial 9 in the depth direction is assigned to the determination of the item. The jog dial 9 is pushed in the inner direction of the body case to move the cursor K1, and further it is pushed in the depth direction to determine the item where the cursor K1 is displayed. Thereby, the mode can be set quickly.

In this connection, in the case where the rotation is the up and down direction and the pushing in the inner the up and down direction and the pushing in the inner direction of the body case are only prepared in jog dial 9 like a conventional one, as shown in FIG. 11, the selection and determination of the item can not be separately performed to set the operation mode. To set the alarm to a starting condition for example, the jog dial is pushed in the inner direction of the body case to set the alarm to a non-starting condition once, thereafter the jog dial must be pushed in the inner direction of the body case again to move the cursor K1 to the position of "ON". Two times operations are necessary to set the alarm to a starting condition. However, in the portable telephone device 1, since the jog dial 9 can be operated in the three directions, the selection and determination can be performed separately to set the operation mode, and the alarm can be set by one time operation so as to perform the setting quickly.

(3) Operation and Effects

In the above constitution, in the case of the portable telephone device 1, the first switch 27 pushed when the jog dial 9 is pushed in the inner direction of the body case and the second switch 23 pushed when the jog dial 9 is pushed in the depth direction are provided so as to add two pushing operations in addition to the rotation operation, so that the operations in three directions can be performed. In this case, since the jog dial 9 is provided on the left side of the body case and at the home position of the thumb when the body case is held, the jog dial 9 can be operated with the thumb easily in the state that the body case 2 is held with one hand. Moreover, as a pushing operation newly added, the slide operation in the depth direction of the body case 2 is selected from the slide operations along the side of the thumb, so that this operation also can be performed easily.

Further, in the portable telephone device 1, the pushing operation in the depth direction newly added is used to perform the retrieval of the telephone directory list quickly. More specifically, when the jog dial 9 is simply rotated in a desired direction, one click rotation moves the cursor for one line. However, when the jog dial 9 is rotated in a desired direction while pushing in the depth direction, one click rotation moves the cursor for ten lines. Thereby, even when a desired partner is distant from the current position, these operations are combined to reach at the desired partner quickly, thereby the retrieval of the telephone directory list can be performed quickly. Also, the jog dial 9 is unnecessary to be moved many times like a conventional one so that the operational efficiency in retrieval can be improved.

Further, in the portable telephone device 1, in the character input mode, the jog dial 9 is rotated in a desired direction to move the cursor K1 upward or downward, and the jog dial 9 is rotated while pushing in the depth direction to move the cursor K1 right or left. Thereby, the cursor K1 can be moved in the lines direction or in the columns direction in the table of the Japanese syllabary, so that the cursor can reach at the desired character quickly and the character can be input quickly comparing to the conventional one. Also, the cursor K1 can be moved in the lines direction or in the columns direction, so that the rotating amount of the jog dial 9 to reach at the desired character can be reduced and the operational efficiency in inputting a character can be improved.

In this way, in the portable telephone device 1, when the jog dial 9 is rotated to move the cursor K1, the jog dial 9 is pushed in the depth direction to change the movement amount or the movement direction of the cursor K1. Thereby, the cursor K1 can be moved quickly comparing to the conventional one and the operational efficiency and the usability can be improved remarkably.

Further, in the portable telephone device 1, when setting the operation mode, the push of the jog dial 9 is the inner direction of the body case is assigned to the selection of the item, and the push of the jog dial 9 in the Thereby, the selection and determination of the item can be performed independently, so that the number of times to be operated in setting the operation mode can be reduced comparing to the conventional one and the usability can be improved remarkably.

According to the above constitution, the push operation in the depth direction is added as the push operation of the jog dial 9 to change the movement amount or the movement direction of the cursor K1, so that the cursor can reach at the desired partner quickly comparing to the conventional one and the operational efficiency and the usability can be improved remarkably. Also, the push operation in the depth direction is added as the push operation of the jog dial 9 to perform the selection and determination of the item independently in setting the operation mode, so that the operational efficiency and the usability can be improved remarkably comparing to the conventional one. Therefore, the portable telephone device 1 which has the remarkably superior operational efficiency and the improved usability comparing to the conventional one can be realized.

(4) Other Aspects of Implementation

The above described embodiment has been dealt with a case where when the jog dial 9 is rotated upward or downward while pushing it in the depth direction, the cursor K1 is moved for ten lines. However, the present invention is not limited to this, but the cursor K1 can be moved for other movement amount.

Further, the above described embodiment has been dealt with a case where the jog dial 9 is rotated and simultaneously pushed in the depth direction to change the movement amount of the cursor K1 into ten lines. However, the present invention is not limited to this, but after the jog dial 9 is pushed in the depth direction, the movement amount of the cursor K1 can be changed into ten lines. In short, if the movement amount of the cursor K1 is changed by pushing the jog dial 9 in the depth direction, the same effect as described above can be obtained.

Further, the above described embodiment has been dealt with a case where the jog dial 9 is rotated and simultaneously pushed in the depth direction to change the movement direction of the cursor K1 into the right and left direction. However, the present invention is not limited to this, but after the jog dial 9 is pushed in the depth direction, the movement direction of the cursor K1 can be changed into the right and left direction. In short, if the movement direction of the cursor K1 is changed by pushing the jog 9 in the depth direction, the same effect as described above can be obtained.

Further, the above described embodiment has been dealt with a case where in setting the operation mode, two push operations of the jog dial 9 are assigned to the selection and determination. However, the present invention is not limited to this, but this is applicable in other operation mode.

Further, the above described embodiment has been dealt with a case where this invention is applied to a portable telephone device. However, the present invention is not limited to this, but can be widely applied to other electrical devices which display a cursor to select the item.

Further, the above described embodiment has been dealt with a case where when the retrieval of the telephone directory list or the character input mode, the jog dial 9 is pushed in the depth direction to change the movement direction or the movement amount of the cursor K1. However, the present invention is not limited to this, but this is applicable to other operation mode. In short, the same effect described above can be obtained, if the device is provided with: a body case having the outward shape which is held with one hand in the state that the thumb or the base of the thumb is put on one side of it; an operation key which has a disc member wherein a projection being on part of the outer of the disc member slightly projection from the one side to the outside is provided at the position where the thumb is put on the one side of the body case so that the projection comes into contact with the thumb rotatively, for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give strength toward the depth direction of the body case to the disc member; operation detecting means for detecting the rotation, push, and slide of the operation key; storing means for storing a plurality of items; display means for displaying a plurality of items among from the plurality of items read out from the storing means and displaying a cursor; and control means for moving the cursor in a desired direction to match the cursor position with one of the plurality of items and display it in accordance with the detected result of the rotation of the operation key output from the operation detecting means, for changing the movement direction or movement amount of the cursor caused by the rotation in accordance with the detected result of the slide of the operation key output from the operation detecting means, and for determining the item where the cursor is positioned in accordance with the detected result of the push of the operation key output from the operation detecting means.

Further, the above described embodiment has been dealt with a case where when setting the operation mode, two push operations of the jog dial 9 is assigned to the selection and determination. However, the present invention is not limited to this, but this is applicable in other operation mode. In short, the same effect described above can be obtained, if the device is provided with: a body case having the outward shape which is held with one hand in the state that the thumb or the base of the thumb is put on one side of it; an operation key, which has a disc member wherein a projection being a part of the outer of the disc member slightly projected from the one side to the outside is provided at the position where the thumb is put on the one side of the body case so that the projection comes into contact with the thumb rotatively, for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give the strength toward the depth direction of the body case to the disc member; operation detecting means for detecting the rotation, push, and slide of the operation key; storing means for storing a plurality of hierarchical items; display means for displaying a desired item among from the plurality of items stored in the storing means and displaying a cursor; and control means for moving the cursor in a predetermined direction on upper hierarchical items in accordance with the detected result of the rotation of the operation key output from the operation detecting means when the upper hierarchical items are displayed on the display means, for moving the cursor in a predetermined direction on lower hierarchical items in accordance with the detected result of the push of the operation key output from the operation detecting means when the lower hierarchical items are displayed on the display means, and for determining the lower hierarchical item where the cursor is being displayed in accordance with the detected result of the slide of the operation key output from the operation detecting means.

Further, the above described embodiment has been dealt with a case where the disc member 20 is supported on the base part 25 through the slide member 26. However, the present invention is not limited to this, but other constitution can be applied, if the supporting member is such a member that rotates the disc member, moves it in the inner direction of the body case, and moves it in the depth direction of the body case. In short, the electronic device can be improved in the operation efficiency and the usability, since the rotary operation key can be operated in three directions in the state that the body case is held with one hand, if the rotary operation key provided in the body case of the electronic device which includes the body case having the outward shape held with one hand in the state that the thumb or the base of the thumb is put on one side of it, the rotary operation key is provided with: a disc member wherein a projection being a part of the outer of the disc member slightly projected from the one side to the outside is provided at the position where the thumb is put on the one side of the body case so that the projection comes into contact with the thumb rotatively; and supporting means for supporting the disc member in such a way that the disc member rotates when the thumb is bent and extended to rub the one side to give the rotative power to the disc member, or in such a way that the disc member moves in the pushed direction when the thumb is pushed into the inside of the one side to give the push power toward the inner of the body case to the disc member, or in such a way that the disc member moves in the depth direction when the thumb is slid on the one side to give the strength toward the depth direction of the body case to the sic member.

Industrial Applicability

A communication terminal device and a rotary operation key according to the present invention are applied a portable telephone device which executes various operations using, for example, a rotary operation key.

What is claimed is:

1. An electronic device comprising:
   a body case;
   an operation key having an operation part projecting out from said body case, so as to perform a rotary operation along an outer side of said body case, a first pressing operation almost at a right angle to a rotary axis of the rotary operation, and a second pressing operation along the rotary axis of the rotary operation;
   operation detecting means for detecting each of the rotary operation, the first pressing operation, and the second pressing operation of said operation key;
   storage means for storing plural items;
   display means for displaying the plural items read out from said storage means; and
   control means for receiving a detection output from said operation detecting means, for controlling scrolling through the plural items at a first scrolling speed with the rotary operation of said operation key on said display means, for determining a selected item with the first pressing operation of said operation key, and for changing the first scrolling speed to a second, faster scrolling speed for the plural items with the second pressing operation of said operation key.

2. The electronic device according to claim 1, wherein:
   said body case is capable of being held with one hand; and
   said operation key is provided at one side of said body case.

3. The electronic device according to claim 1, wherein said operation key is disc-shaped.

4. A communication terminal device comprising:
   a body case;
   an operation key having an operation part projecting out from said body case, so as to perform a rotary operation along an outer side of said body case, a first pressing operation almost at a right angle to a rotary axis of the rotary operation, and a second pressing operation along the rotary axis of the rotary operation;
   operation detecting means for detecting each of the rotary operation, the first pressing operation, and the second pressing operation of said operation key;
   storage means for storing plural items;
   display means for displaying the plural items read out from said storage means; and
   control means for receiving a detection output from said operation detecting means, for controlling scrolling through the plural items at a first scrolling speed with the rotary operation of said operation key on said display means, for determining a selected item with the first pressing operation of said operation key, and for changing the first scrolling speed to a second, faster scrolling speed for the plural items with the second pressing operation of said operation key.

5. The communication terminal device according to claim 1, wherein:
   said plural items are the telephone numbers of communication partners; and
   said control means selects a desired partner with said rotary operation and calls said desired partner selected by said first pressing operation of said operation key.

6. The communication terminal device according to claim 1, wherein:
   said body case is capable of being held with one hand; and
   said operation key is provided at one side of said body case.

7. The communication terminal device according to claim 3, wherein
   said operation key is disc-shaped.

8. An electronic device comprising:
   a body case;
   an operation key having an operation part projecting out from said body case, so as to perform a rotary operation along the outer side of said body case, a first pressing operation almost at right angle to the rotary axis of said rotary operation, and a second pressing operation along said rotary axis of said rotary operation;
   operation detecting means for detecting said rotary operation, first pressing operation, and second pressing operation of said operation key;
   storage means for storing plural items;
   display means for arranging the plural items, which are read out from said storage means, in first and second directions to display them and for displaying a cursor; and
   a control means for receiving a detection output from said operation detecting means, for moving said cursor for said plural items in said first direction with said rotary operation of said operation key on said display means to select a desired item, for determining said item selected by said first pressing operation of said operation key, and for changing a moving direction with said second pressing operation of said operation key so as to move said cursor in said second direction for said plural items on said display means.

9. The electronic device according to claim 8, wherein the plural items are letters of an alphabet.

10. The electronic device according to claim 5, wherein:
    said body case is capable of being held with one hand; and said operation key is provided at one side of said body case.

11. The electronic device according to claim 5, wherein said operation key is disc-shaped.

12. An electronic device comprising:

a body case;

an operation key having an operation part projecting out from said body base, so as to perform a rotary operation along an outer side of said body case, a first pressing operation almost at a right angle to a rotary axis of the rotary operation, and a second pressing operation along the rotary axis of the rotary operation;

operation detecting means for detecting each of the rotary operation, the first pressing operation, and the second pressing operation of said operation key;

storage means for storing hierarchically plural items;

display means for displaying the hierarchically plural items read out from said storage means and a cursor; and control means for receiving a detection output from said operation detecting means, for by moving the cursor to a desired high-ranked item with the rotary operation of said operation key while high-ranked plural items are displayed on said display means, for determining a selection of the desired high-ranked item with the first pressing operation so as to display low-ranked plural items associated with the selected high-ranked item, for moving the cursor to a desired low-ranked item with the first pressing operation of said operation key on said display means, and for determining a selection of the low-ranked item with the second pressing operation of said operation key.

13. A rotary device, comprising:

a disc-shaped part;

a holding part for holding said disc-shaped part so that said disc-shaped part is able to rotate, that a pressing operation is able to be performed almost at a right angle to a rotary axis of rotation of said disc-shaped part, and that a pressing operation is able to be performed toward a first direction along the rotary axis of rotation of said disc-shaped part and including an arm member for limiting movement in a second direction opposite to said first direction of a portion of said disc-shaped part, so that an opposite portion of said disc-shaped part moves in said first direction;

rotation detecting means for detecting how much said disc-shaped part is rotated;

a first switch for detecting the pressing operation almost at a right angle to the rotary axis of the rotation of said disc-shaped part; and a second switch for detecting the pressing operation in the first direction along the rotary axis of rotation by being contacted by said opposite portion of said disc-shaped part.

* * * * *